May 9, 1950    J. ROSE    2,507,421
MOTOR VEHICLE CONSTRUCTION
Filed June 9, 1947    2 Sheets-Sheet 1
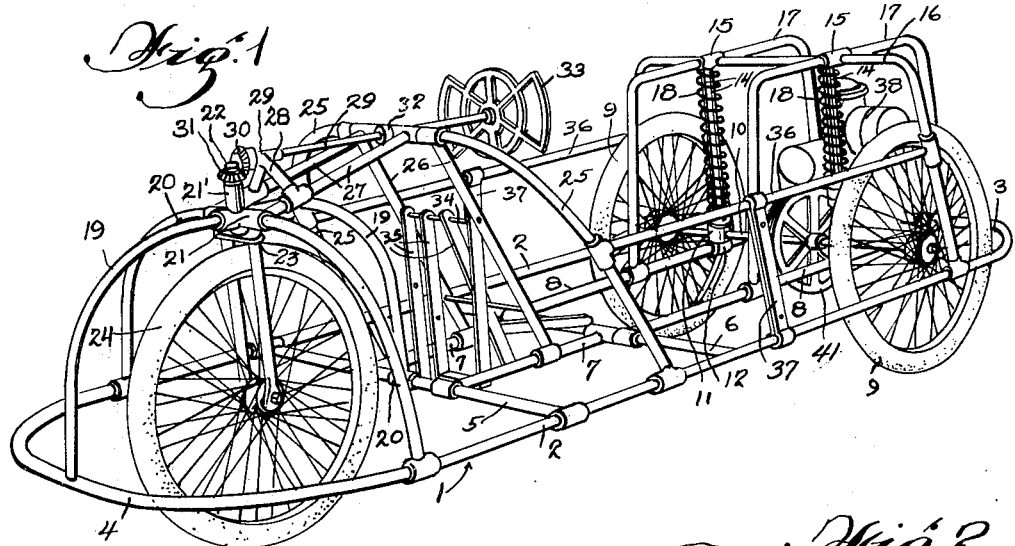
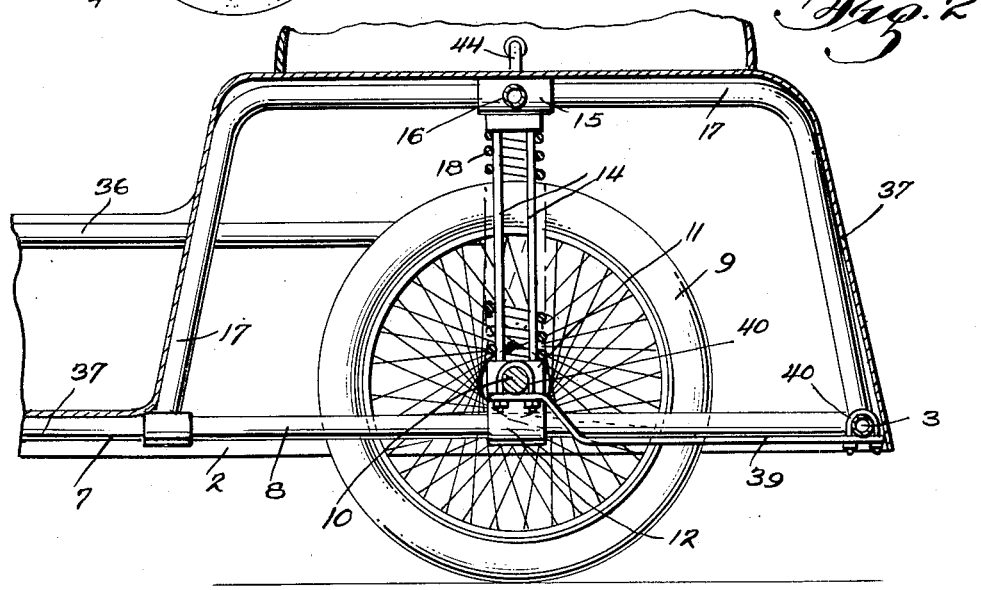
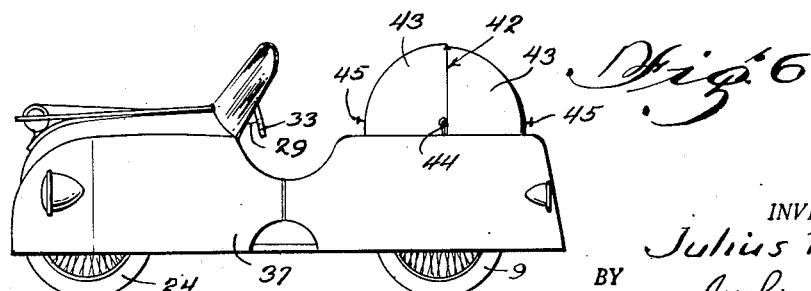
INVENTOR.
Julius Rose
BY Jacobi & Jacobi
ATTORNEYS

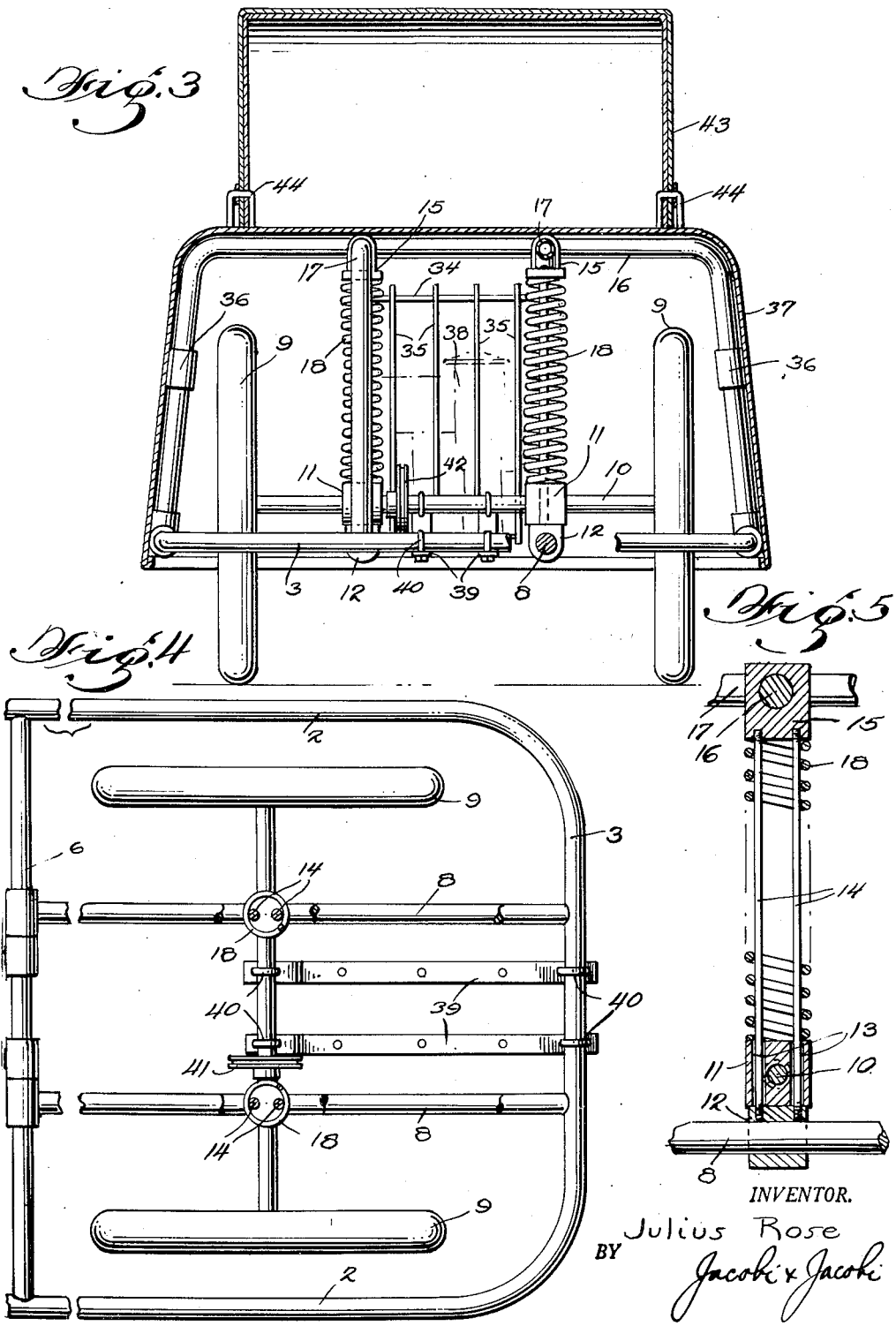

Patented May 9, 1950

2,507,421

UNITED STATES PATENT OFFICE 2,507,421

MOTOR VEHICLE CONSTRUCTION

Julius Rose, Ridgewood, N. Y.

Application June 9, 1947, Serial No. 753,532

3 Claims. (Cl. 180—27)

This invention relates to a motor vehicle and it is one object of the invention to provide a motor vehicle having a frame formed of metal tubes, which are welded together, and so arranged that they form a solid frame which is very strong but of light weight and thus allowed to be driven by a small engine which consumes a comparatively small amount of fuel.

Another object of the invention is to provide a motor vehicle having a frame so formed that it may be supported by two rear wheels and a single front wheel, the front wheel being similar to that of a motor cycle is carried by forks having an upstanding post which is rotatably mounted through a bearing sleeve and geared to a steering shaft extending horizontally in the frame.

Another object of the invention is to provide a motor vehicle having improved springs for yieldably supporting the metal frame over the rear axle, the springs being so arranged that they will have good shock-absorbing qualities and be prevented from moving out of a vertical position when subjected to transverse thrusts.

Another object of the invention is to provide a motor vehicle wherein the frame is provided with an improved arrangement of pedals for controlling and operating the brakes and the throttle for the engine.

Another object of the invention is to provide a motor vehicle with a frame of improved construction supporting a body so formed that it will accommodate a driver and other passengers very comfortably and also have a luggage compartment which is readily accessible and in which a large amount of luggage may be stored. Therefore, the motor vehicle may be conveniently used as a delivery car by merchants or by persons who wish to take a motor trip and carry luggage or camping equipment with them.

Another object of the invention is to provide an improved motor vehicle having a storage compartment which is so formed and so mounted that it may be easily removed when not needed and also easily and quickly replaced.

The invention is illustrated in the accompanying drawings wherein:

Figure 1 is a perspective view of the improved motor vehicle with the body removed in order to show the construction of the frame;

Figure 2 is a vertical sectional view, taken longitudinally of the frame through the rear portion thereof;

Figure 3 is a vertical sectional view, taken transversely through the rear portion of the improved motor vehicle;

Figure 4 is a view showing the rear portion of the frame principally in top plan and partially in section;

Figure 5 is a sectional view taken vertically through one of the springs; and

Figure 6 is a side elevation of the improved motor vehicle.

This improved motor vehicle has a frame shown in Figure 1 and referring to this figure, it will be seen that the frame is formed of metal pipes or tubes which are welded together into a substantially solid structure. The main frame which is indicated in general by the numeral 1 has side bars 2, a rear cross bar 3, and a front bar 4 which extends transversely of the frame and is curved or arcuate from one side bar to the other. Front and rear cross bars 5 and 6 extend between the side bars 2 and between these cross bars are mounted bars 7 which extend longitudinally of the frame and are spaced from each other transversely thereof. There have also been provided bars 8 which extend longitudinally of the frame between the rear cross bar 6 and the rear end bar 3. Between the bars 8 and the side bars 2 are located rear wheels 9 carried by an axle 10 which is journaled through bearing blocks 11. These blocks rest upon couplers or sleeves 12 through which the bars 8 pass and are formed with vertical openings 13 to slidably receive rods 14 having their upper ends screwed into sockets formed in couplings 15 by means of which yokes 16 and 17 are held together in crossed relation to each other. Helical springs 18 which are coiled about the rods 14 and have their upper and lower ends bearing against the couplings 15 and the blocks 11 yieldably support the yokes and the rear portion of the frame, and from an inspection of Figure 5, it will be seen that when the vehicle is in use and the wheels pass over rough places in a road shocks will be absorbed by the springs as the rods 14 slide vertically through the blocks 11.

Above the forward portion of the frame 1 are mounted a longitudinally extending yoke 19 and a transversely extending yoke 20 held in crossed relation to each other by a coupling 21 and having lower ends of their arms secured to the cross bar 5 and to the end bar 4 and side bars 2 of the frame. The coupling not only has side arms to receive the metal tubes from which the yokes 19 and 20 are formed but also has an upstanding sleeve 21' to rotatably receive the post 22 of the forks 23 by means of which the front wheel 24 is rotatably mounted.

Spaced rearwardly from the yokes 19 and 20 is another yoke 25 having its arms extending downwardly at a rearward incline and connected with the side bars 2 of the frame 1. This yoke 25 is supported by struts 26 having their lower ends secured to the bars 7 and in order to brace the upper portion of the yoke there have been provided bracing bars 27 welded at their front ends to the arms of the coupling 21 engaged with the yoke 20.

A bracket 28 having a bearing 29 at its upper end is carried by the bracing bars 27 and through the bearing is rotatably mounted a steering shaft 29 having at its front end a beveled gear 30 meshing with a companion beveled gear 31 at the upper end of the post 22. The rear portion of the steering shaft is journaled through a bearing 32 carried by the yoke 25 between the braces 27 and at its rear end the steering shaft carries a steering wheel 33 by means of which the driver of the vehicle turns the steering shaft and thus imparts steering movements to the front wheel 24. A rod 34 extends between upper portions of the struts 26 and passes through upper ends of strips 35 by means of which pedals for operating brakes and the power plant are supported. Tubes forming upper side bars 36 extend between the side arms of the yokes 16 and 25 and in order to prevent these bars or rails from becoming bent downwardly, there have been provided braces 37 formed from strips of metal.

The yokes and the side bars form a superstructure mounted over the frame 1 and serving as a carrier for the body 37 of the vehicle and since the yokes 17 and 25 are spaced from each other longitudinally of the frame 1, there has been provided midway the length of the vehicle a space in which seats may be installed for use by occupants of the vehicle.

The space within the rear portion of the body serves as a motor chamber and in order to support the motor 38, there have been provided supporting bars 39 which extend longitudinally of the vehicle and have their front and rear ends secured to the axle 10 and the rear bar 3 by clamps 40. Rotary motion is transmitted from the motor to the axle by means of a belt having its front portion trained about a pulley 41 carried by the axle and its rear portion trained about a pulley carried by the shaft of the motor. A storage box or casing 42 is mounted over the rear portion of the body and in the present illustration consists of companion front and rear arcuate sections 43 formed of sheet metal or plastic and having interfitting engagement with each other. Hinge brackets 44 which are carried by the body pass transversely through the lower inner corners of the two sections 43 to pivotally mount the same and handles 45 are provided in order that the said sections may be readily grasped and swung to opened and closed positions.

From the foregoing description of the construction of my improved motor vehicle, the method of making same and the application thereof to use will be readily understood and it will be seen that I have provided a comparatively simple, inexpensive and efficient means for carrying out the various objects of my invention.

While I have particularly described the elements best adapted to perform the functions set forth, it is apparent that various changes in form, proportion and in the minor details of construction may be resorted to, without departing from the spirit or sacrificing any of the principles of the invention.

Having thus described the invention, what is claimed is:

1. A vehicle comprising a body having front and rear superstructures spaced from each other longitudinally of the frame to provide a driver's cockpit between the said superstructures, front and rear wheels mounted in the superstructures, and a luggage compartment mounted upon the rear superstructure and having front and rear sections, said sections being of arcuate shape and one having its inner end portion overlapping the other section, and brackets carried by the body and having portions passing through the lower corners of the side walls of inner end portions of the said sections and mounting the sections for tilting movement to opened and closed positions.

2. A vehicle comprising a frame having front and rear superstructures spaced from each other longitudinally of the frame to provide a driver's cockpit between the said superstructures, front and rear wheels mounted in the superstructures, the front wheel being mounted for steering movements, means for supporting a motor in the rear superstructure, a body of sheet material having front and rear portions enclosing the said superstructures and an intermediate portion extending along the bottom and sides of the cockpit, a luggage compartment resting upon the rear portion of said body and having front and rear sections, said sections being of arcuate shape and one having its inner end portion overlapping the other section, and brackets carried by the body and having portions passing through the lower corners of the side walls of inner end portions of the said sections and mounting the sections for tilting movement to opened and closed positions.

3. A luggage carrier for a motor vehicle comprising companion sections, said sections being of arcuate shape and each having segmental side walls, one section having its inner portion overlapping the other section, and brackets adapted to be mounted upright upon a portion of a motor vehicle and having portions passing through lower corners of the side walls of the said sections and mounting the sections for tilting movement to opened and closed positions.

JULIUS ROSE.

REFERENCES CITED

The following references are of record in the file of this patent:

UNITED STATES PATENTS

| Number | Name | Date |
|---|---|---|
| 931,990 | Brewster | Aug. 24, 1909 |
| 1,473,161 | Rogers | Nov. 6, 1923 |

FOREIGN PATENTS

| Number | Country | Date |
|---|---|---|
| 850,110 | France | Sept. 4, 1939 |